(12) United States Patent
Bedingfield et al.

(10) Patent No.: US 7,754,971 B2
(45) Date of Patent: Jul. 13, 2010

(54) DETECTABLE PULL TAPE

(75) Inventors: Steven L. Bedingfield, LaGrange, GA (US); David D. Morris, Newnan, GA (US); Andrew D. Child, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 801 days.

(21) Appl. No.: 11/602,786

(22) Filed: Nov. 21, 2006

(65) Prior Publication Data

US 2008/0115960 A1 May 22, 2008

(51) Int. Cl.
*H01B 7/08* (2006.01)
(52) U.S. Cl. .................................. 174/117 M
(58) Field of Classification Search ............. 174/117 F, 174/117 M, 36, 69
See application file for complete search history.

(56) References Cited

U.S. PATENT DOCUMENTS

| | | | | |
|---|---|---|---|---|
| 3,447,120 A | | 5/1969 | Rask et al. .................. 339/143 |
| 3,476,870 A | * | 11/1969 | Ross ........................... 174/69 |
| 4,095,042 A | | 6/1978 | Ross ........................... 174/36 |
| 4,804,806 A | | 2/1989 | Orr, Jr. et al. ............... 174/117 |
| 4,956,524 A | * | 9/1990 | Karkow ................. 174/117 M |
| 5,119,020 A | | 6/1992 | Massey et al. .............. 324/158 |
| 5,373,103 A | | 12/1994 | Orr, Jr. et al. ................. 174/36 |
| 5,380,954 A | | 1/1995 | Orr, Jr. et al. ............... 174/117 |
| 5,760,340 A | | 6/1998 | Orr, Jr. et al. ............... 174/117 |
| 5,773,762 A | | 6/1998 | Orr, Jr. et al. ............... 174/117 |
| 6,737,574 B2 | | 5/2004 | Sylvia et al. .................. 174/36 |
| 7,600,539 B2 | * | 10/2009 | Malloy et al. ........... 139/387 R |
| 2004/0016566 A1 | | 1/2004 | Sylvia et al. ................ 174/117 |

FOREIGN PATENT DOCUMENTS

FR 2 776 135 9/1999

OTHER PUBLICATIONS

Patent Cooperation Treaty PCT International Search Report. Date of Mailing, Apr. 25, 2008. International Application No. PCT/US2007/023725.

* cited by examiner

*Primary Examiner*—Chau N Nguyen
(74) *Attorney, Agent, or Firm*—Cheryl J. Brickey

(57) ABSTRACT

A detectable pull tape comprising at least one elongated conductive wire extending longitudinally in the tape, wherein each elongated conductive wire has a coating of insulation, a woven outer cover formed from nonconductive warp and nonconductive weft yarns, the warp yarns extending longitudinally in the tape and the weft yarns extending transversely in the tape and weaving over and under the warp yarns, and a set of binder yarns extending longitudinally in the tape, the binder yarns weaving with the weft yarns on at least one side of the conductive wires to lock the warp yarns and the conductive wires in position relative to each other. A method of detecting the location of conduit using a detectable pull tape is also disclosed.

7 Claims, 2 Drawing Sheets

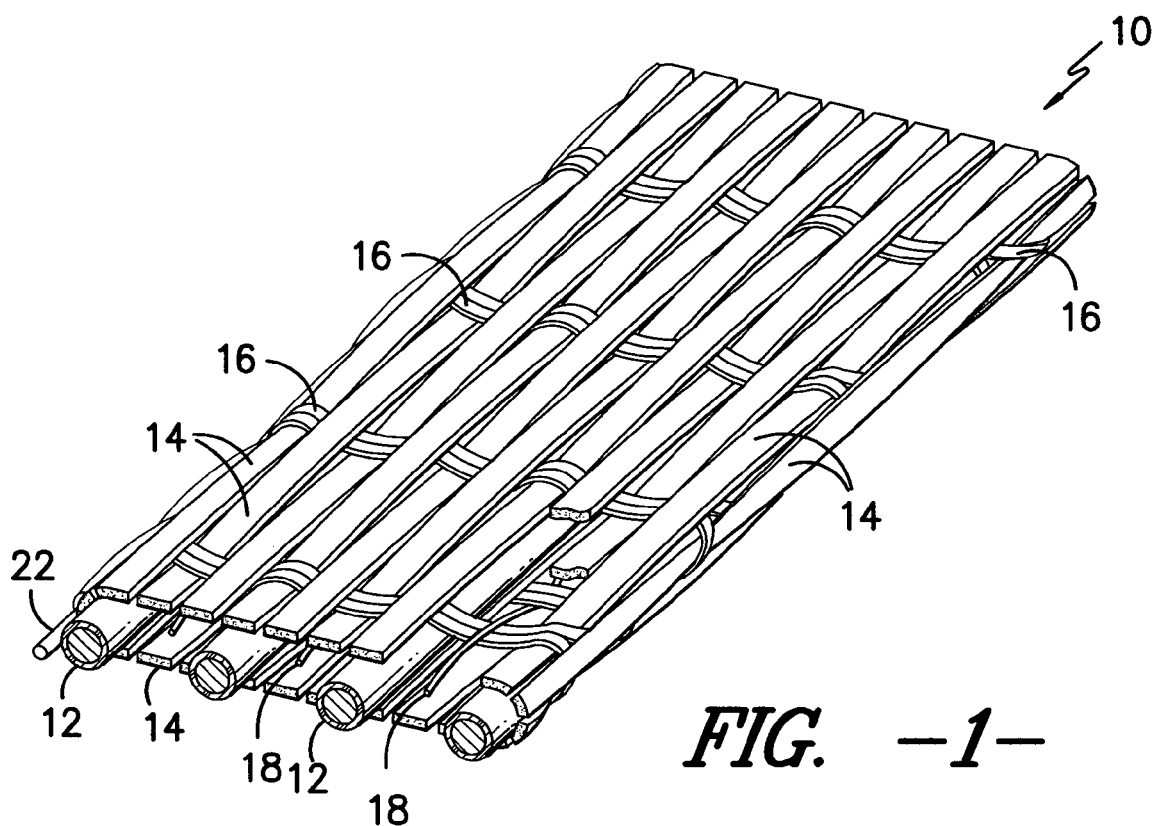
FIG. -1-
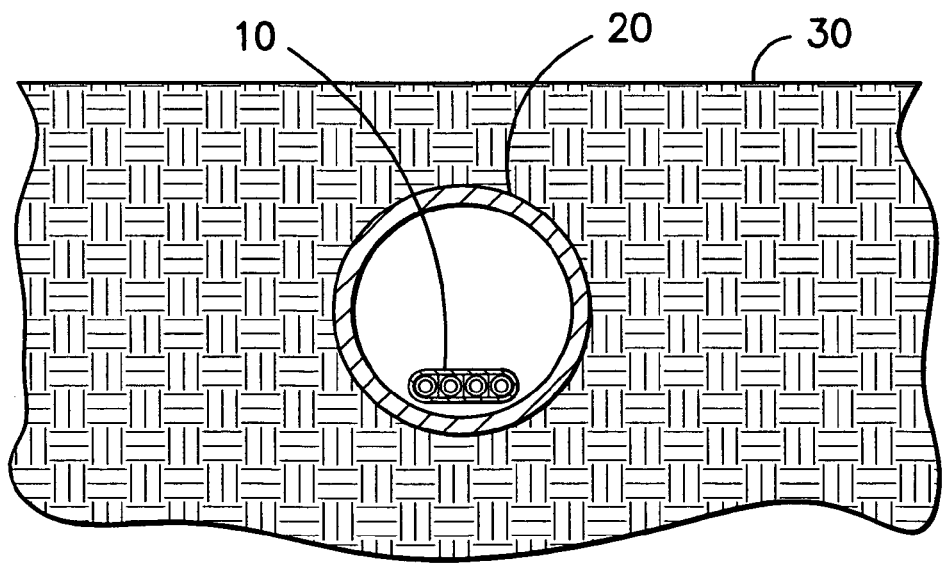
FIG. -2-

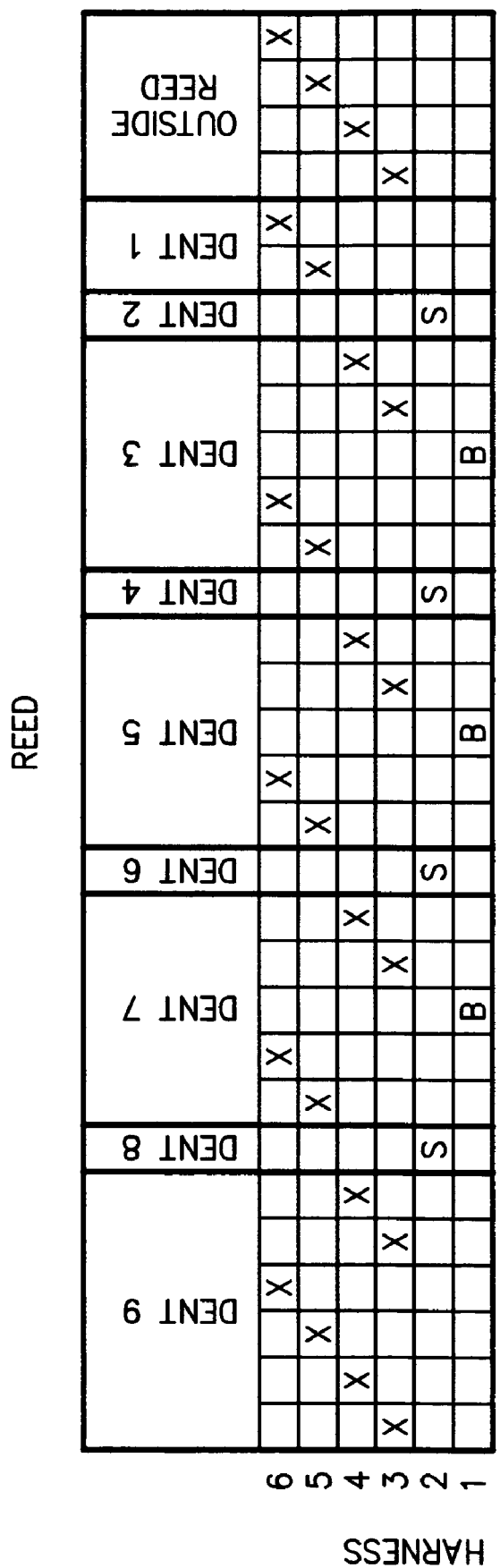
FIG. -3-

DETECTABLE PULL TAPE

TECHNICAL FIELD

This invention relates generally to detectable pull tapes. More particularly, the invention relates to detectable pull tapes including elongated conductive wires surrounded by a nonconductive woven cover. Methods for detecting conduits with detectable pull tapes in the ground are also provided.

BACKGROUND

With increasing use of all dielectric cable in data communications and telecommunications systems, a need exists for reliable and economical methods for detecting dielectric cable, such as fiber optic cable and empty conduits, in underground systems. Underground conduits that are not occupied by electrical cables are difficult to locate on the surface prior to digging or trenching. Current methods for locating existing underground dielectric cable for repair and maintenance include exploratory drilling, known as posthole drilling, which is a slow and often costly and unreliable detection method that poses the risks of accidentally damaging or destroying buried cables.

Electrical wires can be inserted and energized with AC power to produce an electromagnetic field that is detectable on the surface. A detectable pull tape serves the dual purpose of enabling detecting and being useful for pulling in an electrical or fiber optic cable. Presently available detectable pull tapes are prone to abrasion related failures because the electrical wires are located on at least a portion of the outer surface of the pull tape. The tapes are abraded when threaded though the conduit grounding the signal at the point of abrasion resulting in the loss of signal over the remainder of the tape.

There are electric transmission cables with woven shielding comprising metallized warp and weft yarns to shield the conductive wires from external and internal interference. These cables would not be suitable for use as pull tapes as the warp and weft yarns would block the electromagnetic field produced by the conductive wires.

Thus, a detectable tape is needed that includes electrical conductivity and resistance sufficient to help provide reliable and accurate signal detection to locate underground cable over a long distance or a long span of conduit and will improve the durability of the electrical pathway in the pull tape.

SUMMARY

The present invention provides advantages and/or alternatives over the prior art by providing a detectable pull tape comprising a plurality of elongated conductive wires extending longitudinally in the tape, wherein each elongated conductive wire has a coating of insulation, a woven outer cover formed from nonconductive warp and nonconductive weft yarns, the warp yarns extending longitudinally in the tape and the weft yarns extending transversely in the tape and weaving over and under the warp yarns, and a set of binder yarns extending longitudinally in the tape, the binder yarns weaving with the weft yarns on at least one side of the conductive wires to lock the warp yarns and the conductive wires in position relative to each other. A method of detecting the location of conduit using a detectable pull tape is also disclosed.

BRIEF DESCRIPTION OF THE DRAWINGS

The present invention will now be described by way of example only, with reference to the accompanying drawings which constitute a part of the specification herein and in which:

FIG. 1 is an illustrative view of an exemplary detectable pull tape; and

FIG. 2 is a view of an exemplary detectable pull tape treaded through a conduit in the ground.

FIG. 3 is a weave diagram of an exemplary detectable pull tape

DETAILED DESCRIPTION

Referring now to FIG. 1, there is shown a cross-sectional view of one embodiment of the detectable pull tape 10 comprising elongated conductive wires 12, nonconductive warp yarns 14, nonconductive weft yarns 16, and nonconductive binder yarns 18. The elongated conductive wires 12 extend longitudinally in the pull tape 10.

The nonconductive warp yarns 14 and weft yarns 16 form a woven outer cover protecting the conductive wires 12 from abrasion, but does not interfere with or block the electromagnetic field created by the conductive wires 12. It has been found that when a portion or all of conductive wires 12 are located on an outer surface of the pull tape, there is significantly less durability to corrosion, abrasion, and shorting. The warp yarns extend longitudinally along the tape and the weft yarns extend transversally in the tape and weave over and under the warp yarns. A set of binder yarns 18 extend longitudinally in the tape, the binder yarns weaving with the weft yarns 16 on at least one side of the conductive wires 12 to lock the warp yarns 14 and the conductive wires 12 in position relative to each other. Preferably, the binder yarns 18 are woven with the weft yarns 16 on opposite sides of the conductive wires 12 to lock the warp yarns 14 and the conductive wires 12 in position relative to each other. In one embodiment, the conductive wires 12 are separated from one another along their length by a single binder yarn 18.

In one embodiment, a first group of the nonconductive warp yarns weave with the nonconductive weft yarns in an upper plane above the plane of the conductive wires and a second group of the warp yarns weave with the weft yarns in a lower plane below the plane of the conductive wires. In another embodiment, the pull tape 10 includes at least one knitted catch cord yarn 22 along an outer edge of the pull tape 10. The knitted catch cord yarn 22 encloses the pull tape 10 and prevents the tape from easily unraveling when the weft yarn is pulled.

The elongated conductive wires are preferably arranged in a generally side-by-side manner to form a substantially flat tape configuration which makes it highly flexible in making installation and routing to the proper electrical terminals. Preferably, the substantially flat tape has a width of about 0.5 to 1.0 inches. In another embodiment, the pull tape 10 has a flat width of less than 0.5 inches. It has been found that a flat tape of these dimensions has greater durability to abrasion than a more rounded shape. In addition, flat tapes of these dimensions have been found to have a lower propensity to cause friction-induced breaches in the conduit in areas where the conduit makes sharp turns or bends.

The pull tape 10 may contain 1 conductive wire 12, or a plurality of conductive wires 12. Each wire may be a single wire with a coating of insulation or it may consist of a cell of individual wires and have a coating of insulation. The number and conductivity of the wires is determined by the end use. The conductive wires are constructed of a suitable conductive metal including, but not limited to, steel, aluminum, silver and copper. In one embodiment, the wires have a resistance of less than 20Ω per mile. The required resistance depends on the length of the conduit span and the desire signal strength. The resistance of the pull tape can be tailored for the application by adjusting the gauge of the wires and/or the number of conductors incorporated into the tape. In one embodiment, the conductive wires are copper wires with a gage in a range of from about 16 ga to about 30 ga, and preferably about 22 ga, and a diameter in a range of from about 0.010 inch to about 0.045 inch, and preferably 0.0253 inch. In one embodiment, the pull tape contains 4 copper wires each being 22 ga. Metallic conductors of larger gage can increase the conductivity of the tape. Larger gage conductors, however, can cause the tape to be undesirably stiff and/or heavy. The insulation of the conductive wires 12 includes, but is not limited to, a layer of heat resistant polymer, such as polyethylene, polypropylene, polyvinyl chloride, and nylon.

Preferably, the warp yarns 14, the weft yarns 16 and the binder yarn 18 are constructed of a suitable nonconductive material including, but not limited to, aramid fibers, polyethylene fibers, polypropylene fibers, polyester fibers, other suitable fibers and some combination thereof. The nonconductive warp yarns 14 give the pull tape 10 tenacity and strength and preferably have less than 10% elongation. In one embodiment, the warp yarns 14 have strength of at least 600 lbs, preferably between about 600 and 1500 lbs more preferably between about 1250 and 1500 lbs. In another embodiment, the warp yarns have strength up to 6,000 lbs.

Polyester yarn is a preferred material of construction of the warp yarns 14, the weft yarns 16 and the binder yarns 18 because of its low cost, light weight and high tensile strength. The resulting tape is lightweight and highly flexible. The tape also has minimum tensile (break) strength sufficient to permit the tape to be used in other applications, e.g., installing fiber optic cable or other wires, wherein the tape is attached to a cable or wire and pulled through an empty conduit to install the cable. The tensile strength of the tape also allows the tape to be used in measuring long spans of cable conduit, wherein the tape is inserted into an empty conduit and pulled through the empty conduit to measure the span.

The pull tape 10 preferably is printable, meaning that the outer woven cover is able to be printed on. Preferably the pull tape 10 includes a plurality of length markings printed along the length of the pull tape at regular intervals.

The process for detecting a conduit in the ground using the detectable pull tape of the invention comprises:

1) placing a conduit into the ground;
2) threading a detectable pull tape through the conduit, wherein the detectable pull tape comprises a plurality of elongated conductive wires extending longitudinally in the tape, wherein each elongated conductive wire has a coating of insulation;

a woven outer cover formed from nonconductive warp and nonconductive weft yarns, the warp yarns extending longitudinally in the tape and the weft yarns extending transversely in the tape and weaving over and under the warp yarns; and, a set of binder yarns extending longitudinally in the tape, the binder yarns weaving with the weft yarns on at least one side of the conductive wires to lock the warp yarns and the conductive wires in position relative to each other;

3) applying an electrical current through the pull tape; and, 4) determining the location of the conduit by detecting the electromagnetic field of the pull tape.

FIG. 2 shows the detectable pull tape 10 treaded through a conduit in the ground. The pull tape 10 is located in the conduit 20 in the ground 30. Preferably, the detectable pull tape 10 is threaded through the conduit 20 by blowing the pull tape 10 through the conduit 20 or using vacuum to suck the pull tape through the conduit 20. When the pull tape 10 has a current applied to it, the electrical wires produce an electromagnetic field that can be detected on the surface of the ground 30 by an electricmagnetic field detector. The amount of electromagnetic field at the surface of the ground 30 depends on many factors, including the conductivity of the wires, depth of the conduit 20, amount of current applied to the wires, frequency of the current, and the materials separating the conduit from the surface of the ground (ie. other wires, pipes, type of soil).

EXAMPLE

A detectable pull tape shown in FIG. 1 was formed in the following manner. The warp yarns used to form the tubular woven outer cover used were 4/1000/494 HT polyester. There were 24 ends used in the woven outer cover, approximately 12 on the top and 12 on the bottom of the tape. The fill yarn used was 1/250/96 textured polyester yarn at a spacing of 11 picks per inch. The catch cord was a 250 denier textured PET yarn and the binder yarn was a T92 (available from American Efried) continuous filament PET yarn. There were 4 wires in the pull tape, each being a 22 gauge multi-stranded copper wire with a PVC coating. While this example has 4 wires, other wire configurations could have been used. The tape was woven according to the weave diagram of FIG. 3 and the resulting pull tape had an average width of approximately 13 millimeters. Once the pull tape was formed, foot markers were printed onto one surface of the pull tape to mark distances.

While the present invention has been illustrated and described in relation to certain potentially preferred embodiments and practices, it is to be understood that the illustrated and described embodiments and practices are illustrative only and that the present invention is in no event to be limited thereto. Rather, it is fully contemplated that modifications and variations to the present invention will no doubt occur to those of skill in the art upon reading the above description and/or through practice of the invention. It is therefore intended that the present invention shall extend to all such modifications and variations as may incorporate the broad aspects of the present invention within the full spirit and scope of the invention.

What is claimed is:

1. A detectable pull tape comprising:

a plurality of elongated conductive wires extending longitudinally in the tape, wherein each elongated conductive wire has a coating of insulation and the elongated conductive wires are arranged in a generally side-by-side manner to define a substantially flat tape configuration;

a woven outer cover formed from nonconductive warp and nonconductive weft yarns, the warp yarns extending longitudinally in the tape and the weft yarns extending transversely in the tape and weaving over and under the warp yarns, wherein a first group of the nonconductive warp yarns weave with the nonconductive weft yarns in an upper plane above the plane of the conductive wires and a second group of the warp yarns weave with the weft yarns in a lower plane below the plane of the conductive wires;

a set of binder yarns extending longitudinally in the tape, the binder yarns weaving with the weft yarns on each side of the conductive wires to lock the warp yarns and the conductive wires in position relative to each other, wherein the conductive wires are separated from each other along their length by a single binder yarn; and, at least one knitted catch cord yarn along an outer edge of the pull tape.

2. The detectable pull tape of claim 1, wherein the substantially flat tape has a width of about 0.2 to 1.0 inches.

3. The detectable pull tape of claim 1, wherein the nonconductive warp yarns have less than 10% elongation.

4. The detectable pull tape of claim 1, wherein the nonconductive warp yarns have strength of at least 600 lbs.

5. The detectable pull tape of claim 1, wherein the detectable pull tape is able to be printed.

6. The detectable pull tape of claim 1, wherein the detectable pull tape has length markings printed along the length of the pull tape at regular intervals.

7. The detectable pull tape of claim 1, wherein the detectable pull tape produces an electromagnetic field.

* * * * *